United States Patent
Sumner et al.

(10) Patent No.: US 6,185,502 B1
(45) Date of Patent: Feb. 6, 2001

(54) PASSIVE POSITION FIX SYSTEM

(75) Inventors: Donald L. Sumner, Keller, TX (US); Sung Leong Chew, Jamaica, NY (US); Joseph N. Dmytrasz, Glen Head, NY (US); Lorraine M. Mauser, Commack, NY (US); Joseph Gatta, Port Washington, NY (US)

(73) Assignee: The United States of America as represented by the Secretary of the Navy, Washington, DC (US)

(*) Notice: Under 35 U.S.C. 154(b), the term of this patent shall be extended for 0 days.

(21) Appl. No.: 09/219,834

(22) Filed: Dec. 23, 1998

(51) Int. Cl.[7] .............................. G01M 1/12; G01C 21/00
(52) U.S. Cl. ..................... 701/208; 73/382 G; 702/92; 702/152; 701/220
(58) Field of Search ................................. 701/200, 206, 701/207, 208, 220, 221; 702/92, 150, 152, 153; 73/382 R, 382 G; 340/988, 995

(56) References Cited

U.S. PATENT DOCUMENTS

| | | | |
|---|---|---|---|
| 3,731,537 | * 5/1973 | Trageser | 73/382 R |
| 4,173,784 | * 11/1979 | Heath et al. | 701/220 |
| 4,399,694 | * 8/1983 | Mayer | 73/382 G |
| 4,783,742 | * 11/1988 | Peters | 702/6 |
| 5,339,684 | * 8/1994 | Jircitano et al. | 701/220 |

* cited by examiner

Primary Examiner—William A. Cuchlinski, Jr.
Assistant Examiner—Edward Pipala
(74) Attorney, Agent, or Firm—John Tarlano

(57) ABSTRACT

A passive position fix system for a vehicle in which a gyro first provides a first gyro position of the vehicle, a map storage means which receives the first gyro position and in response thereto provides map-sets containing a set of gravity gradients and a gravity anomaly associated with geographic positions in the vacinity of the first gyro position, a gravity sensor for providing a GSS-set comprising a sensed set of gravity gradients values and a gravity anomaly at the position of the vehicle, a comparing means for sequentially receiving the map-sets so as to determine when there is a match between the GSS-set and a map-set and providing a displacement vector, and a processor for placing a second gyro position in the gyro based on the first gyro position and the displacement vector.

2 Claims, 5 Drawing Sheets

PASSIVE POSITION FIX SYSTEM

FIELD OF THE INVENTION

The present invention relates to a system for providing an accurate geographic position of a vehicle.

BACKGROUND OF THE INVENTION

In the past, gyros and accelerometers have been used in a combination, in order to provide inputs to a gyro navigation system. These inputs have been used by the gyro navigation system in order to provide a geographic position of a vehicle on which the system is placed.

However, with the passage of time, sensor axes of the gyros becomes less accurate, due to drift of spin axes of the rotors of the gyros. The provided geographic position of the vehicle becomes less accurate with time, due to such drift of the spin axes of the rotors of the gyros.

The passive position fix system of the present invention uses gyros and accelerometers of a gyro navigation system on a vehicle to find a gyro position of a vehicle on which the passive position fix system has been placed. The passive position fix system compares stored a gravity gradient and gravity anomaly map-set, for each of several geographic positions in a region around the gyro position of the vehicle, with measurements from gravity gradient sensors and a gravity anomaly sensor. The passive position fix system finds a best estimate of the position difference between the gyro position and the geographic position of the vehicle. The gyro navigation system is updated with this best estimate of position difference. The passive position fix system thus provides an updated gyro position of the vehicle.

The gyro navigation system, gravity gradient and gravity anomaly map-sets, and a gravity gradient and gravity anomaly sensor system are central parts of the passive position fix system.

The gravity gradient and gravity anomaly sensor system and the gravity gradient and gravity anomaly map-sets are used in a map matching technique in the passive position fix system. The gravity gradient and gravity anomaly sensor system and the gravity gradient and gravity anomaly map-sets can be used to periodically update the gyro position provided by the gyro navigation system.

The gravity gradient and gravity anomaly sensor system and gravity gradient and gravity anomaly map-sets could be used independently to provide geographic locations of a vehicle.

The passive position fix system has a gravity gradient and gravity anomaly sensor system. The gravity gradient and gravity anomaly sensor system firstly measures six gravity related parameters. The six measured parameters are five gravity gradients and one gravity anomaly.

These six measured parameters are then successively compared to each of several stored map-sets for geographic positions in the region of the gyro position as provided by the gyro navigation system. A stored map-set is a set of stored map parameters for a corresponding geographic position. A set of stored map parameters consists of five predetermined gravity gradients and one predetermined gravity anomaly of a corresponding geographic position.

Information derived from comparisons of the map-sets with the six measured gravity related parameters is used by a real-time filtering algorithm to compute a displacement vector between the gyro position as provided by the gyro navigation system and the geographic position whose map-set provides a match. The displacement vector is used to update the gyro position of the gyro navigation system of the passive position fix system.

An objective of the passive position fix system (PPFS) is to allow an operator on a vehicle to accurately determine the geographic position of the vehicle, in real-time, without exposure or radiation of energy, in a completely passive manner.

The objectives of the PPFS are:

a) passivity b) accuracy c) manual/automatic fix site selection and course guidance from site to site

SUMMARY OF THE INVENTION

A passive position fix system on a vehicle, the vehicle having a geographic position over the earth comprising gyro means for providing a first gyro position of the vehicle, map storage means for receiving the first gyro position and in response providing map-sets associated with geographic positions in the vicinity of the first gyro position provided by the gyro means, each map-set comprising a stored set of gravity gradients and a gravity anomaly at an associated geographic position on the earth, gravity sensor means for providing a GSS-set, the GSS-set comprising a sensed set of gravity gradients values and a gravity anomaly value at the geographic position of the vehicle, comparator means for receiving the GSS-set and for sequencially receiving the map-sets and for determining when there is a match between the GSS-set and a map-set and for providing a displacement vector based on which map-set matches the GSS-set, and processor means for placing a second gyro position in the gyro means based on the first gyro position and on the displacement vector.

DESCRIPTION OF THE PREFERRED EMBODIMENT

Figure 1:
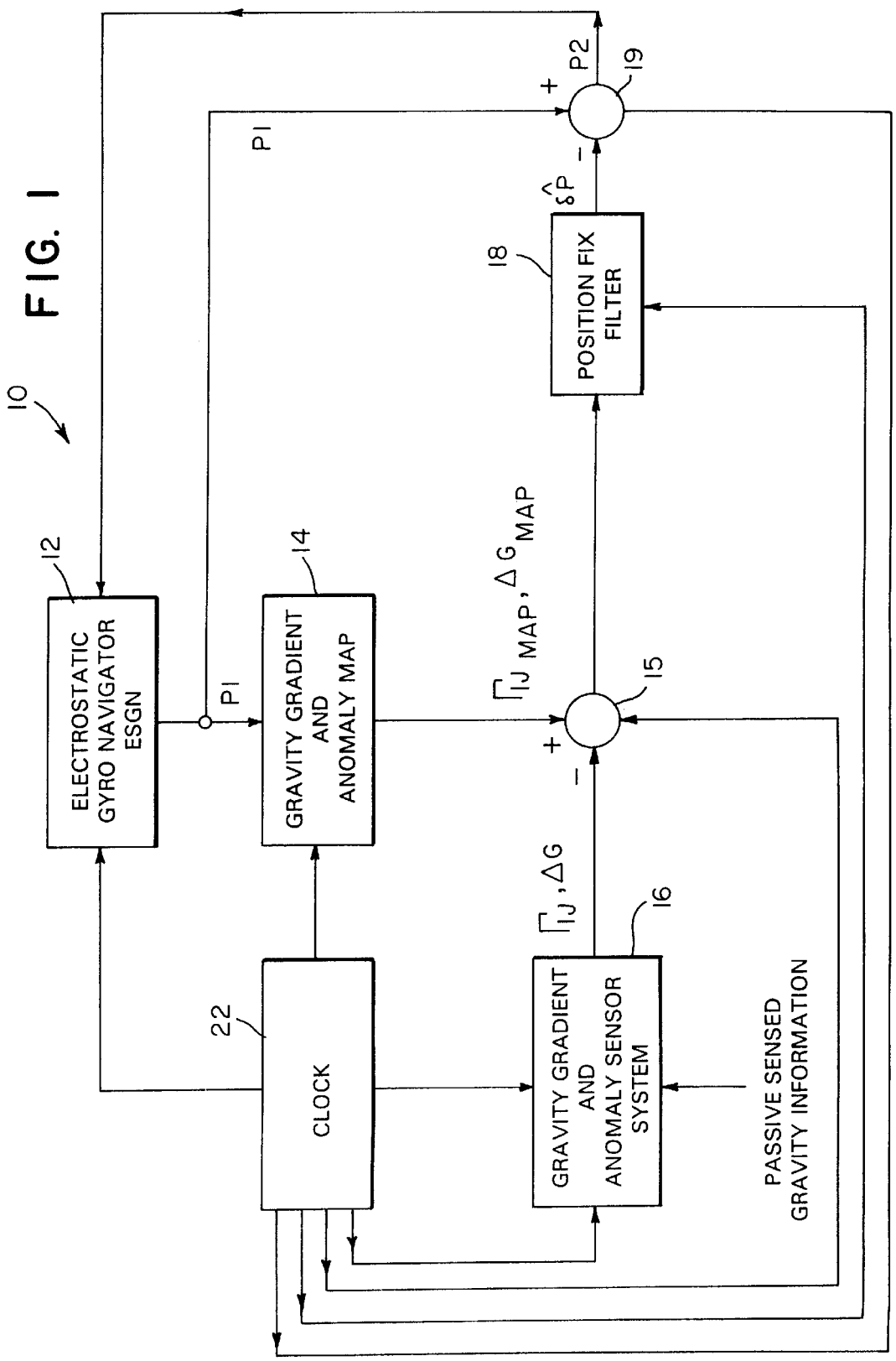
FIG. 1 is a block diagram of the passive position fix system.
Figure 2:
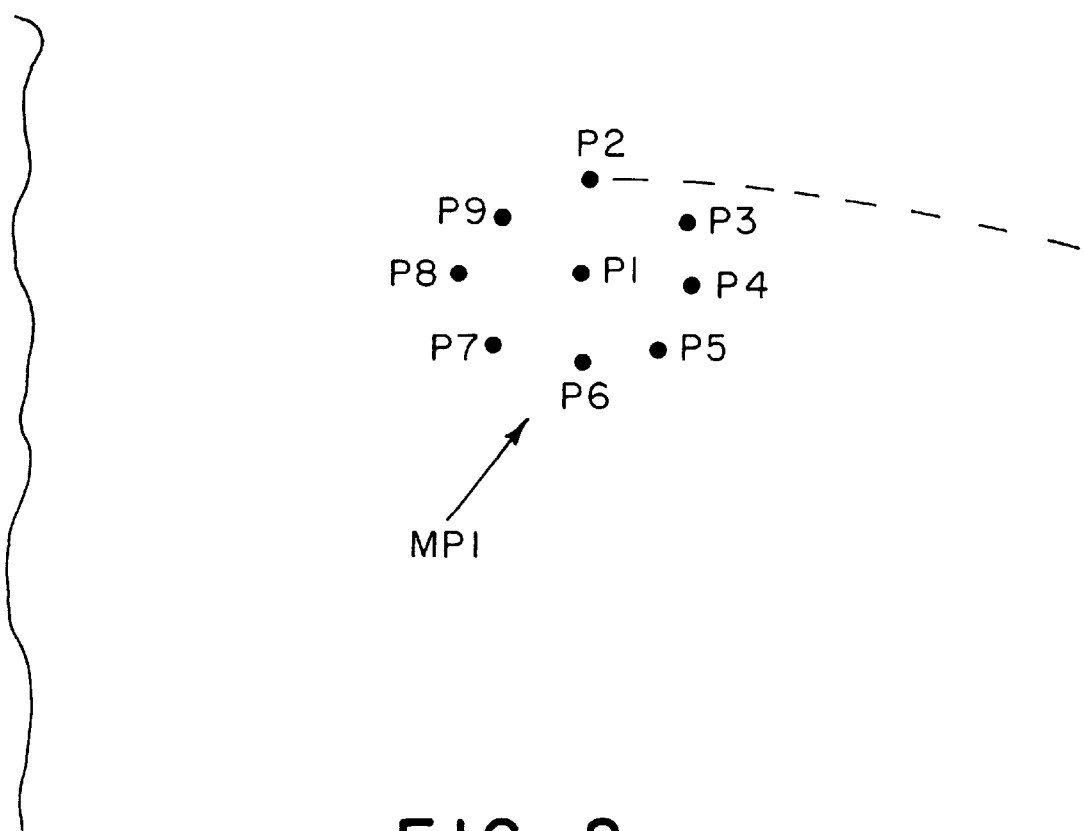
FIG. 2 is a diagramic view of a vehicle over a point of land having a geographic position P2.

The passive position fix system (PPFS) 10 of FIG. 1 is used on a vehicle. The vehicle has an actual geograpic position P2, as shown in FIG. 2.

The passive position fix system 10 has an electrostatic gyro navigation system 12. The navigator 12 provides a gyro position value p1. Navigation system 12 is also known as an ESGN.

The PPFS 10 has a map storage and retrieval means 14. The map storage and retrival means 14 is connected to electrostatic gyro navigation system 12. The gyro navigation system 12 sends a gyro position value p1 to the map storage and retrieval means 14. This gyro position value p1 indicates, although incorrectly, that the vehicle is over a point of land having geographic position P1.

The map storage and retrival means 14 contains map-sets. Each map-set has five gravity gradient values for gravity gradients that exist at a certain height over a point of land, plus one gravity anomaly value for a gravity force that exists at the same height over that point of land. Each map-set has five gravity gradient values and one gravity anomaly value.

The map storage and retrieval means 14 retrieves a map MP1 of FIG. 2, map MP1 having a number of map-sets for geographic positions around geographic position P1, in response to means 14 receiving a gyro position value p1 from system 12. Means 14 places the map-sets of map MP1 in a preprocessor 15. In the map matching technique, several map-sets for geographic positions around geographic position P1, are thus nearly simultaneously retrieved from within means 14, by means 14, and stored in preprocessor 15.

The PPFS 10 has a gravity gradient and gravity anomaly sensor system 16. The system 16 is also known as a GSS. The system 16 consists of one gravity gradiometer and two gravimeters. The gravity gradiometer of sensor system 16 measures five gravity gradient values at the actual geographic position P2 of the vehicle. One of the two gravimeters of system 16 measures one gravity value, also known as a gravity anomaly value, at the actual geographic position P2 of the vehicle. The measured gravity gradient values and gravity anamoly value are set to preprocessor 15.

The five measured gravity gradient values and one gravity anomaly value form a GSS-set. The GSS-set of the true gravity gradients and the true gravity anomaly is detected by using a continuous carrousel gradiometer and one functioning gravimeter.

The gradiometer has three wheels that are mutually at right angles to one another. Four accelerometers are on each wheel. Each wheel produces one in line, that is planar, gravity gradient value and one cross gravity gradient value. The six gravity gravity values, from the three wheels, are also referred to as gravity tensors. One of the gravity gradient values is not of viable use, since that gravity gradient value has a trivial value, that is a zero value, or a redundant value to that of another gravity gradient value.

The one functioning gravimeter measures the local force of gravity due to earth, beginning at land that is below the vehicle. From this measured value of gravity is subtracted a mean value of gravity for earth, over a wide ring of land over which the vehicle is operating. The difference value is the gravity anomaly value is sensed by the GSS 16.

The PPFS 10 has the preprocessor 15 for storing and conditioning the GSS-set, and the map-data sets of map MP1. Again map MP1 is provided to preprocessor 15 by means 14 based on the gyro position value p1 as provided by gyro navigation system 12. The map storage and retrival means 14, and sensor system 16 are each connected to preprocessor 15.

The PPFS 10 has a comparator 18, also known as a passive position fix filter. The preprocessor 15 is connected to the comparator 18. Computer algorithms are located within comparator 18 to successively compare each of the map-sets, with the GSS-set, all of which come from preprocessor 15. Comparator 18 then determines a displacement vector, delta P, from the geographic position that corresponds to the gyro position value provided by the gyro navigation system 12, to a geographic position, whose map-set matches the GSS-set. For example comparator 18 determines a displacement vector, delta P2, from the geographic position P1 to geographic position P2, whose map-set matches the GSS-set.

The PPFS 10 also has a processor 19. The processor 19 is connected to comparator 18. Computer software in processor 19 is used for selecting/deploying nearby fix sites and for providing manual/automatic course guidance to the next site. Processor 19 uses the displacement vector, delta P2. This displacement vector, delta P2, is used in processor 19, along with the first gyro position value p1 from gyro navigator system 12, to calculate a second gyro position value p2. The first gyro position value p1 is replaced by the second gyro position value p2 in gyro navigation system 12.

Again, a cumulative movement of a vehicle (not shown) actually places the vehicle, having the PPFS 10 on board, over a geographic position P2. However, the ESGN 12 of the vehicle provides inaccurate gyro position value p1.

In an example of the process of the map matching technique, at time T1 a gyro position value p1 is read out of ESGN 12. This position value is inaccurate since the submarine is at geographic position P2. Gyro position value p1 is read into map storage and retrival means 14.

Map storage and retrival means 14 reads out map-sets for geographic positions on map MP1. The map-data sets for the geographic positions on the map MP1 are at and around geographic position P1. These map-sets are read into preprocessor 15. Map storage storage and retrival means 14 contains map set S1 for geographic position P1, map-set S2 for geographic position P2 . . . and map set S9 for geographicposition P9. Geographic positions P2, P3 . . . P9 form a circle around geographic position P1. Geographic position P1 is the center of the map that is read out of means 14, since gyro position value p1 indicates, although inacurately, that the geographic position of the vehicle is P1.

Map-set S1 has five gravity gradient values and one gravity anomaly value for geographic position P1. Map-sets S2, S3, S4 . . . S9, respectively for neighboring geographic positions P2, P3, P4, . . . P9, each have five gravity gradient values and one gravity anomaly value. Positions P2, P3, P4 . . . P9 forms a rectangle that encloses geographic position P1. The map-data sets S1, S2, S3, . . . S9, respectively, for geographic positions P1, P2, P3 . . . P9 on the map MP1, are serially read out of map storage and retrival means 14.

A map-data set S for each of the nine geographic positions of the map MP1 has five map gravity gradient values $g_{xxmapP}$, $g_{xymapP}$, $g_{yymapP}$, $g_{yzmapP}$, and $g_{zzmapP}$ and one gravity anomaly value $G_{mapP}$. Again, means 14 contains map-data sets, each map-data set having five gravity gradient values and one gravity anomaly value.

At time T0, the map-sets S1, S2, S3, S4 . . . S9, are read into preprocessor 15 from map-data storage and retrival means 14, under control of clock 22.

At time T0, five gravity gradients and one gravity anomaly are sensed by GSS 16 and read into preprocessor 15, while the vehicle is at geographic position P2. GSS 16 is under control of clock 22. The gravity gradients values from GSS 16 are part of a GSS-set, G, and are $g_{xxP2}$, $g_{xyPx}$, $g_{yyP2}$, $g_{yzP2}$, and $g_{zzP2}$. The gravity anomaly value from GSS 16, also in GSS-set, G, is $G_{P2}$. These gravity gradient values and the gravity anomaly value correspond to the gravity gradients and gravity anomaly for geographic position P2, since the vehicle is actually over geographic position P2.

At time T1, the first map-set S1, of the map of geographic positions having map-sets S1, S2, S3, S4 . . . S9, is read from preprocessor 15 into filter 18, under control of clock 22.

At time T1, the GSS-set, G, of five gravity gradient values and one gravity anomaly value, is read from preprocessor 15 into processor 18. Preprocessor 15 is under control of clock 22. The gravity gradient values in GSS data-set G are $g_{xxP2}$, $g_{xyP2}$, $g_{yyP2}$, $g_{yzP2}$, and $g_{zzP2}$. The gravity anomaly value in GSS-data set G is $GP_2$. These gravity gradient values and the gravity anomaly value are valid and correspond to the gravity gradients and gravity anomaly for geographic position P2, since the submarine is actually over geographic position P2. At time T1 a poor match occurs in filter 18 between map-set S1 and GSS-set G.

At time T2, the GSS-set, G, is again read from preprocessor 15 into comparator 18. At time T2, map-set, S2, is read from preprocessor 15 into comparator 18. At this time, an excellent match occurs in filter 18 between the map-set S2 and the GSS-set G.

Map-data set S2 corresponds to geographic position P2. Map-data set S2 has map gravity gradient values $g_{xxmapP2}$, $g_{xymapP2}$, $g_{ypmapP2}$, $g_{yzmapP2}$ and $g_{zzmapP2}$ and map gravity anomaly value $G_{mapP2}$.

At time T2, the comparator 18 compares the map gravity gradient value $g_{xxmapP2}$ and sensed gravity gradient value $g_{xxP2}$, $g_{xymapP2}$ and $g_{xyP2}$, $g_{yymapP2}$ and $g_{yyP2}$, $g_{yzmapP2}$ and $g_{yzP2}$, $g_{zzmapP2}$ and $g_{zzP2}$ that come from preprocessor 15. The comparator 18 also compares the map gravity anomaly value $G_{mapP2}$ and sensed gravity anomaly value $G_{P2}$ that come from preprocessor 15. An excellent match is found by comparator 18.

Even though an excellent match has been found, the map matching process is repeated at times T3, T4, . . . T9, until the remaining map-sets S3, S4 . . . S9 for the map are compared with GSS-set G in comparator 18. The comparisons of the nine map-sets S1, S2, S3 . . . S9 with GSS-set G reveals that the best match occurs between the map-set S2 and the GSS-set G. The comparator 18 calculates displacement vector delta P2, since the vector distance from the center position P1 of the map MP1, to the geographic position P2, is delta P2. P2 is also referred to as the position difference vector.

Again, the map-sets S1, S2, S3 . . . S9 are successively read out of preprocessor 15 and the GSS-set G is repeatedly read out of preprocessor 15. A map-set and the GSS-set are compared in comparator 18. The comparison continues until all map-sets for the map MP1 are compared with the GSS-set in comparator 18.

A match between map-set S2 and GSS-set G in filter 18 causes a displacement vector, delta P2, to be sent from filter 18 to processor 19. The processor 19 calculates a second gyro position value p2 by adding gyro position value p1 and displacement vector delta P2. The calculated second gyro position value p2 is transmitted to ESGN 12 from processor 19. ESGN 12 is updated to contain second gyro position value p2 instead of first gyro position value p1. ESGN 12 thus now provides correct information that the vehicle is at geographic position P2.

Components of the passive position fix system 10, as described above, are shown in FIG. 3. Data processing sections of the gravity sensor system 16 are shown. The first of these sections is a gravity data gathering section 16a for processing gravity inputs to system 16. A preliminary data editing section 16b of the gravity sensor system 16 edits the gravity data, that is, places the data in proper memory locations. Then in section 16c of system 16, north-east-down transformations, that is NED transformations, are calculated from the gravity data. In section 16d of system 16, a smooth filter is used to refine the north-east-down gradients that have been calculated in section 16c.

In the preprocessor 15 of the passive position fix system 10, the GSS measurement is linearized.

In the filter 18 of passive position fix system 10, the length of the displacement vector delta P2 and its direction are determined. The length of the vector and its direction give an estimated position error between the true geographic position P2 and the geographic position P1 that corresponds to the gyro position value p1. The displacement vector delta P2 lies between the geographic position P1, that corresponds to the gyro position value p1, and the true geographic position P2 of the vehicle.

Figure 3:
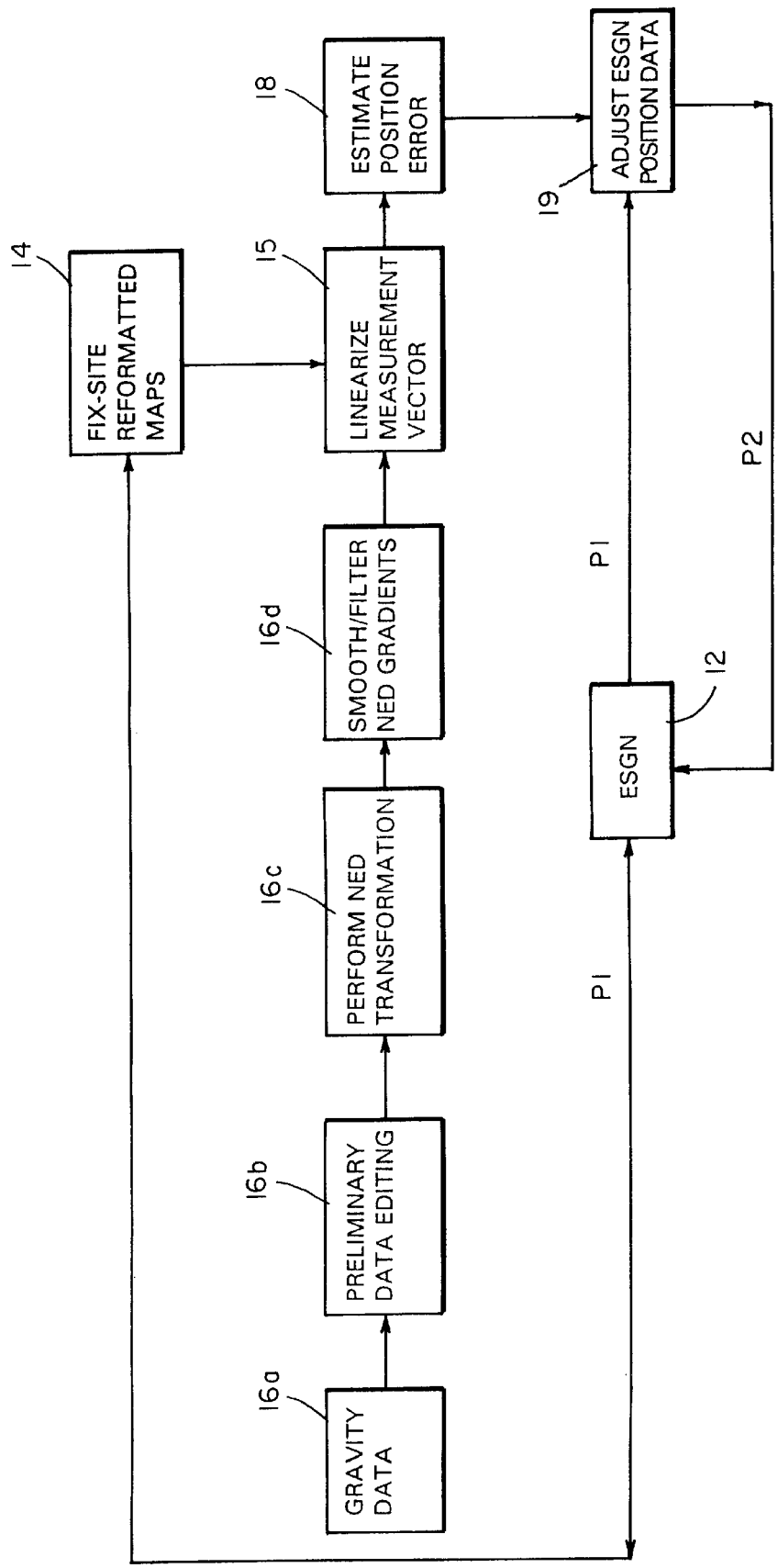
FIG. 3 is a block diagram of data processing sections used in a passive position fix determination.

In processor 19 of FIG. 3, the geographic position value p1 and the displacement vector delta P2 are processed by an algorithm to provide an adjusted gyro position value p2. The adjusted gyro position value p2 is sent to the gyro navigator system 12.

In FIG. 3, it is shown that fix-site reformatted maps are sent from map storage and retrieval means 14 to preprocessor 15. Specific maps are sent as a result of and in agreement with the specific position value p provided by the gyro navigation system 12.

Figure 4:
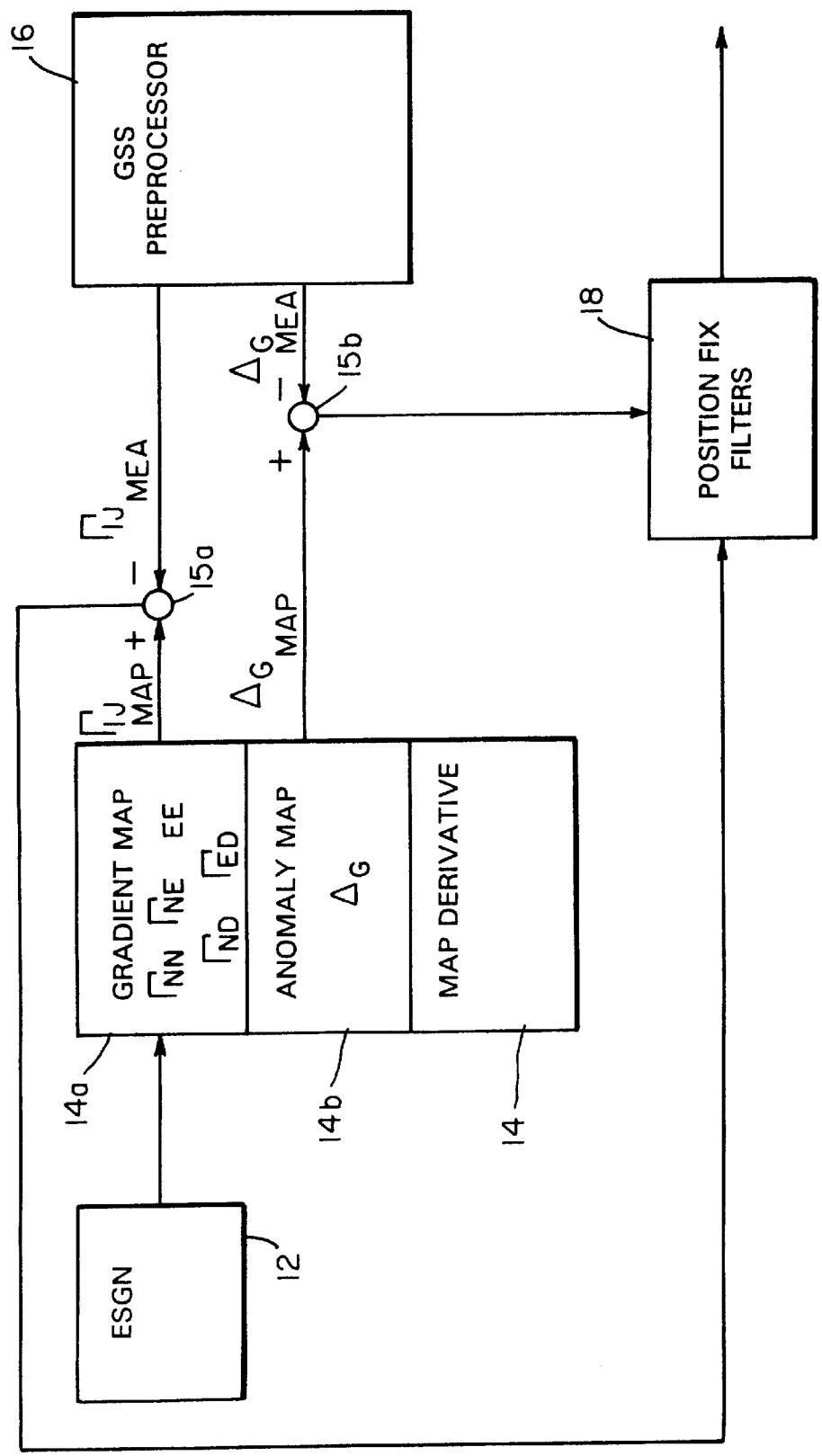
FIG. 4 is a block diagram of map comparison means used in the passive position fix system.

In FIG. 4 it is shown that the passive position fix system 10 has major components including the gyro navigation system 12, the map storage and retrieval means 14, the gravity gradient and gravity anomaly sensor system 16, preprocessor components 15a and 15b, and the comparator 18. The preprocessor 15 of FIG. 1 is shown as divided into two components 15a and 15b in FIG. 4. Component 15a stores the gravity gradient portions of map-sets, in the area around a geographic position P, corresponding to gyro position value p from gyro navigation system 12, and stores the gravity gradient portion of the GSS-set from GSS 16. Component 15b stores the gravity anomaly portions of map-sets, in the area around a geographic position P, corresponding to gyro position value p from gyro navigation system 12, and stores the gravity anomaly portion of the GSS-set from GSS 16.

Again, the preprocessor 15 of FIG. 1 is divided into two components in FIG. 4. Component 15a stores the gravity gradient map portions and the measured gravity gradient portion. The gravity gradient map portions come from the map storage and retrieval means 14 and the measured gradient portion comes from the GSS 16. Component 15b of the preprocessor 15 stores the map gravity anomaly and the measured gravity anomaly.

Gradient map component 14a of the map storage and retrieval system 14 applies the map gravity gradients to the preprocessor component 15a.

Anomaly map component 14b of-the map storage and retrieval system 14 applies the map gravity anomalies to the preprocessor component 15b.

As shown in FIG. 4, position values are emitted from comparator 18 at periodic intervals to system 12 along the track of the the vehicle. The process described above is repeated at intervals so that a position of the vehicle is determined at various points along its track. In this way the exact position of the vehicle is arrived at over time. The corresponding exact position value is supplied to the gyro navigation system 12. The gyro navigation system 12 is updated over time so as to hold an exact position value.

Figure 5:
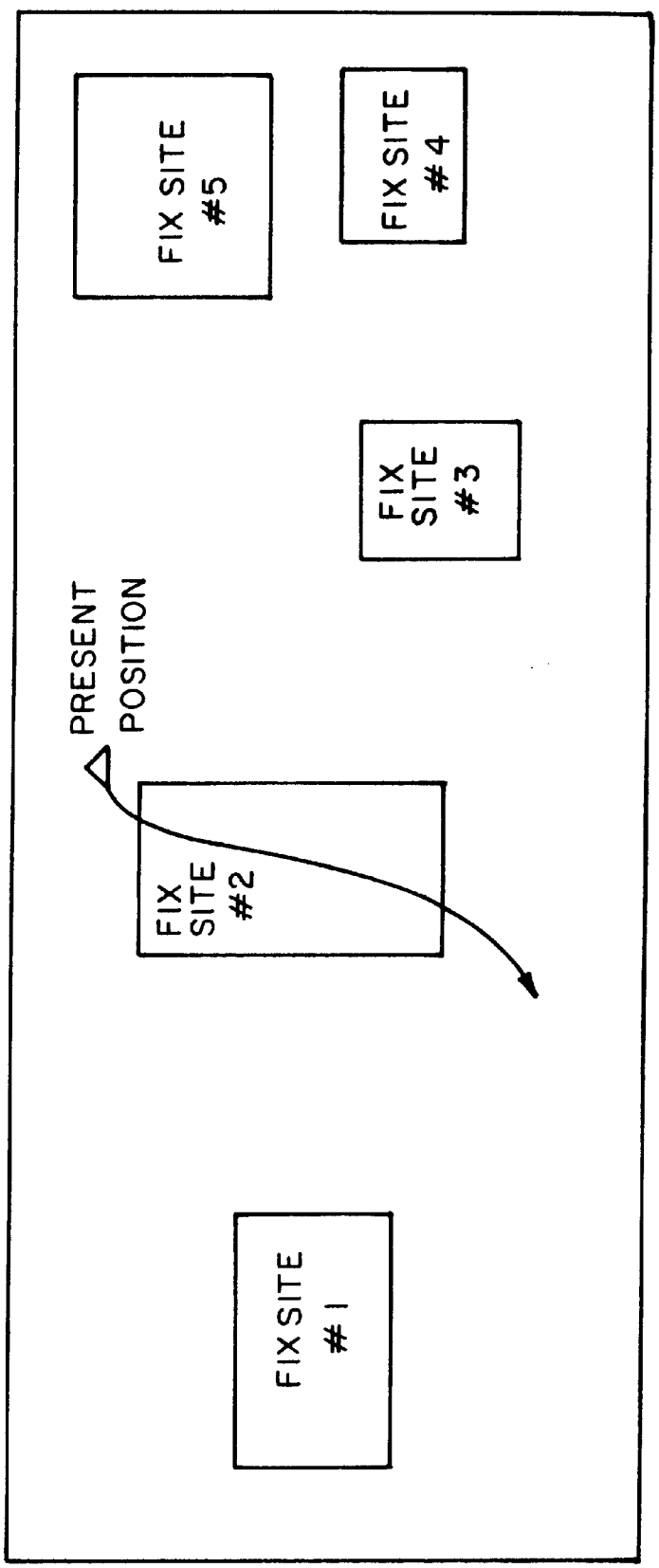
FIG. 5 shows a strawman example of a passive position fix scenario.

FIG. 5 shows a passive position fix scenario. In the scenario, the present position of the vehicle is shown as a triangle. Then the vehicle passed over a fix-site area of land. Gravity gradient and gravity anomaly maps for the fix-site area are stored in map storage and retrieval system 14. As the vehicle passes over the fix-site number 2, the gyro navigation system 12 is updated at periodic points along its track, as described above. After the vehicle exits the area of fix-site number 2, the gyro navigation system 12 is completely updated and holds an exact position.

While the present invention has been disclosed in connection with the preferred embodiment thereof, it should be understood that there may be other embodiments which fall within the spirit and scope of the invention as defined by the following claims.

What is claimed is:

1. A passive position fix system on a vehicle, the vehicle having a geographic position over the earth, comprising:

(a) gyro means for providing a first gyro position of the vehicle;

(b) map storage means for receiving the first gyro position and in response providing map-sets associated with geographic positions in the vicinity of the first gyro position provided by the gyro means, each map-set comprising a stored set of gravity gradients and a gravity anomaly at an associated geographic position on the earth;

(c) gravity sensor means for providing a GSS-set, the GSS-set comprising a sensed set of gravity gradients values and a gravity anomaly value at the geographic position of the vehicle;

(d) comparator means for receiving the GSS-set and for sequencially receiving the map-sets and for determining when there is a match between the GSS-set and a map-set and for providing a displacement vector based on which map-set matches the GSS-set; and (e) processor means for placing a second gyro position in the gyro means based on the first gyro position and on the displacement vector.

2. A passive position fix system on a vehicle, the vehicle having a geographic position over the earth, comprising:

(a) gyro means for providing a first gyro position of the vehicle;

(b) map storage means for receiving the first gyro position and in response providing map-sets associated with geographic positions in the vicinity of the first gyro position provided by the gyro means, each map-set comprising a stored set of gravity gradients and a gravity anomaly at an associated geographic position on the earth;

(c) gravity sensor means for providing a GSS-set, the GSS-set comprising a sensed set of gravity gradients values and a gravity anomaly value at the geographic position of the vehicle;

(d) a preprocessor for storing the map sets and for serially reading out the map-sets and for storing the GSS-set and for reading out the GSS-set along with a map-set;

(e) comparator means for receiving the GSS-set and for serially receiving the map-sets and for determining when there is a match between the GSS-set and a map-set and for providing a displacement vector based on which map-set the GSS-set; and (f) processor means for placing a second gyro position in the gyro means based on the first gyro position and based on the displacement vector.

* * * * *